(12) United States Patent
Donoho (10) Patent No.: US 9,626,560 B2
(45) Date of Patent: *Apr. 18, 2017

(54) METHOD AND APPARATUS FOR COMPRESSED SENSING

(71) Applicant: THE BOARD OF TRUSTEES OF THE LELAND STANFORD JUNIOR UNIVERSITY, Palo Alto, CA (US)

(72) Inventor: David Leigh Donoho, Stanford, CA (US)

(73) Assignee: THE BOARD OF TRUSTEES OF THE LELAND STANFORD JUNIOR UNIVERSITY, Palo Alto, CA (US)

( * ) Notice: Subject to any disclaimer, the term of this patent is extended or adjusted under 35 U.S.C. 154(b) by 158 days.

This patent is subject to a terminal disclaimer.

(21) Appl. No.: 14/507,594

(22) Filed: Oct. 6, 2014

(65) Prior Publication Data
US 2015/0023608 A1    Jan. 22, 2015

Related U.S. Application Data

(63) Continuation of application No. 13/316,857, filed on Dec. 12, 2011, now Pat. No. 8,855,431, which is a (Continued)

(51) Int. Cl.
*G06K 9/00* (2006.01)
*G06T 11/00* (2006.01)
*H04N 19/86* (2014.01)

(52) U.S. Cl.
CPC ....... *G06K 9/0057* (2013.01); *G06K 9/00516* (2013.01); *G06T 11/005* (2013.01);
(Continued)

(58) Field of Classification Search
CPC    G06K 9/0057; G06K 9/00516; G06T 11/005; G06T 2207/20056; G06T 2207/20064
See application file for complete search history.

(56) References Cited

U.S. PATENT DOCUMENTS 5,400,371 A    3/1995    Natarajan
6,567,567 B1    5/2003    Levin et al.
(Continued)

OTHER PUBLICATIONS

Baryshnikov, et al., "Regular Simplices and Gaussian Samples", 1994.
(Continued)

*Primary Examiner* — Aaron W Carter
(74) *Attorney, Agent, or Firm* — Michael A. Glenn; Perkins Coie LLP (57) ABSTRACT

Method and apparatus for compressed sensing yields acceptable quality reconstructions of an object from reduced numbers of measurements. A component x of a signal or image is represented as a vector having m entries. Measurements y, comprising a vector with n entries, where n is less than m, are made. An approximate reconstruction of the m-vector x is made from y. Special measurement matrices allow measurements y=Ax+z, where y is the measured m-vector, x the desired n-vector and z an m-vector representing noise. "A" is an n by m matrix, i.e. an array with fewer rows than columns. "A" enables delivery of an approximate reconstruction, $x^{\#}$, of x. An embodiment discloses approximate reconstruction of x from the reduced-dimensionality measurement y. Given y, and the matrix A, approximate reconstruction $x^{\#}$ of x is possible. This embodiment is driven by the goal of promoting the approximate sparsity of $x^{\#}$.

5 Claims, 1 Drawing Sheet

Related U.S. Application Data continuation of application No. 12/685,468, filed on Jan. 11, 2010, now Pat. No. 8,077,988, which is a continuation of application No. 11/199,675, filed on Aug. 8, 2005, now Pat. No. 7,646,924.

(60) Provisional application No. 60/600,324, filed on Aug. 9, 2004.

(52) U.S. Cl.
CPC .... *H04N 19/86* (2014.11); *G06T 2207/20056* (2013.01); *G06T 2207/20064* (2013.01)

(56) References Cited

U.S. PATENT DOCUMENTS

| | | | | |
|---|---|---|---|---|
| 6,819,279 | B2 | 11/2004 | Pupalaikis | |
| 7,110,458 | B2 | 9/2006 | Divakaran et al. | |
| 7,196,789 | B2 | 3/2007 | Senturia et al. | |
| 7,271,747 | B2 | 9/2007 | Baraniuk et al. | |
| 7,450,032 | B1* | 11/2008 | Cormode | H03M 7/30 341/50 |
| 7,584,396 | B1* | 9/2009 | Cormode | H04L 1/24 341/50 |
| 7,646,924 | B2* | 1/2010 | Donoho | G06K 9/0057 341/50 |
| 8,077,988 | B2* | 12/2011 | Donoho | G06K 9/0057 382/232 |
| 8,855,431 | B2* | 10/2014 | Donoho | G06K 9/0057 382/232 |
| 8,861,655 | B1* | 10/2014 | Al-Naffouri | H04L 1/0054 375/341 |
| 2006/0029279 | A1* | 2/2006 | Donoho | G06K 9/0057 382/232 |
| 2006/0038705 | A1 | 2/2006 | Brady et al. | |
| 2006/0098878 | A1 | 5/2006 | Jojic et al. | |
| 2006/0239336 | A1* | 10/2006 | Baraniuk | H04L 25/20 375/216 |
| 2007/0027656 | A1* | 2/2007 | Baraniuk | G06K 9/0057 702/189 |
| 2008/0228446 | A1* | 9/2008 | Baraniuk | G06K 9/00523 702/189 |
| 2010/0011268 | A1* | 1/2010 | Sinop | G06K 9/6247 714/746 |
| 2010/0207629 | A1* | 8/2010 | Trzasko | G01R 33/561 324/309 |
| 2011/0052023 | A1* | 3/2011 | Garg | G06K 9/6232 382/131 |
| 2011/0101957 | A1* | 5/2011 | Boufounos | H03M 7/3062 324/76.12 |
| 2012/0016921 | A1* | 1/2012 | Davenport | H03M 7/30 708/322 |
| 2012/0249353 | A1* | 10/2012 | Khajehnejad | H03M 7/3062 341/144 |
| 2012/0251013 | A1* | 10/2012 | Porikli | H03M 7/30 382/233 |
| 2012/0259590 | A1* | 10/2012 | Ye | H03M 7/3062 702/189 |
| 2013/0093957 | A1* | 4/2013 | Baraniuk | H04N 9/67 348/659 |
| 2015/0074238 | A1* | 3/2015 | Freris | H03M 7/3062 709/219 |
| 2015/0287223 | A1* | 10/2015 | Bresler | G06T 11/006 382/131 |
| 2016/0048950 | A1* | 2/2016 | Baron | G06T 5/002 382/275 |

OTHER PUBLICATIONS

Boyd, et al., "Convex Optimization", Cambridge University Press (2002); Cambridge, UK.

Brock, et al., "Characterization of a Hadamard transform time-of-flight mass spectrometer", Stanford, CA; Review of Scientific Instruments 71, 1306 (2000).

Buckheit, et al., "Wavelab and reproducible research in Wavelets and Statistics", Ed. Anestis Antoniadis Springer-Verlag Lecture Notes (1995); Stanford Univ., CA.

Byrne, , "Iterative projection onto convex sets using multiple Bregman distances", Inverse Problems 15 (1999); Lowell, MA, 1295-1313.

Candes, et al., "Robust Uncertainty Principles:Exact Signal Reconstruction from Highly Incomplete Frequency Information", Applied and Computational Mathematics, Caltech, Pasadena, CA; Department of Mathematics, University of California, Los Angeles, CA; Jun. 2004: Revised Aug. 2005, 1-41.

Candes, et al., "Stable Signal Recovery from Incomplete and Inaccurate Measurements", Applied and Computational Mathematics, Caltech, Pasadena, CA; Department of Mathematics, University of California, Los Angeles, CA; Feb. 2005; Revised Jun. 2005, 1-15.

Chen, et al., "Atomic decomposition by basis pursuit", SIAM Journal on Scientific Computing, 129-(1998); Stanford, CA, 129-159.

Claerbout, , "Imaging the Earth's Interior", Blackwell Scientific Publications, Inc. (1985); Stanford, CA.

Coifman, et al., "Translation invariant denoising. In Wavelets and Statistics", Ed. Anestis Antoniadis Springer-Verlag Lecture Notes (1995); Yale and Standford Univ.

Dantzig, , "Linear programming and extensions. Princeton", Princeton, NJ: Princeton University Press (1963).

Donoho, , "Compressed Sensing", To Appear, IEEE Trans. Information Theory (2004)).

Donoho, , "De-noising by soft-thresholding", IEEE Trans on Information Theory 41(3): 613-627 (1994); Stanford, CA, 613-627.

Donoho, et al., "Optimally sparse representation in general (nonorthogonal) dictionaries via l.sup.1 minimization)", Proceedings of the National Academy of Sciences; vol. 100, No. 5, available via www.pnas.org/cgi/doi/10/1073/pnas.0437847100, Mar. 4, 2003, pp. 2197-2202.

Donoho, et al., "Uncertainty Principles and Ideal Atomic", IEEE Trans. Info Theory, vol. 47, 2845-62 (2001); Stanford, CA, 2845-2862.

Epstein, "Introduction to the mathematics of medical imaging", Upper Saddle River, NJ: Pearson Education/Prentice Hall (2003).

Gelman, et al., "Bayesian Data Analysis, second edition", Chapman and Hall/CRC, Boca Raton, Florida (2004).

Gentle, , "Random number generation and Monte Carlo methods", Fairfax, VA (1998).

Gill, et al., "Numerical linear algebra and optimization", Redwood City, Calif.: Addison-Wesley Pub. Co. (1991).

Golub, et al., "Matrix Computations. Baltimore: Johns Hopkins University Press (1983);", Johns Hopkins University Press (1983); Stanford, CA.

Gorodnitsky, et al., "Sparse Signal Reconstruction from Limited Data Using Focuss: A Re-weighted Minimum Norm Algorithm", IEEE Transactions on Signal Processing, Mar. 1997, pp. 600-616.

Greenbaum, , "Iterative methods for solving linear systems", Frontiers in Applied Mathematics 17, SIAM, Philadelphia, PA (1997).

Harwit, et al., "Hadamard Transform Optics", Ithaca, New York: Academic Press (1979).

Higgins, , "Sampling theory in Fourier and signal analysis: foundations", Oxford: New York: Clarendon Press; Oxford University Press (1996).

Hoch, et al., "NMR Data Processing", Wiley-Liss, New York (1998).

Jansson, , "Deconvolution: with applications in spectroscopy", New York: Academic Press (1984).

Mallat, , "A Wavelet Tour of Signal Processing", Second edition. Academic Press (1999); Cambridge, UK.

Natterer, , "The Mathematics of Computerized Tomography", Tomography, J.Wiley (1986); SIAM, Philadelphia, PA.

"Nonlinear total variation based noise removal algorithms, Physica D, 1992", Physica D, 1992; Rudin et al.

(56) References Cited

OTHER PUBLICATIONS

Seber, et al., "Linear Regression Analysis", Second edition; Publication by J. Wiley and Sons, New York (2003); Univ. of Auckland, NZ.
Sloane, et al., "Masks for Hadamard transform optics, and weighing designs", Applied Optics. vol. 15, No. 1 (Jan. 1976); Ithaca, NY.
Walker, , "HotBits: Genuine random numbers, generated by radioactive decay", Internet http-www-fourmilab.ch/hotbits/ (1996).
Youla, , "Generalized Image Restoration by the Method of Alternating Orthogonal Projections", IEEE Xplore Abstract; Trans. Circuits and Systems, 25, No. 9 (1978).

* cited by examiner

METHOD AND APPARATUS FOR COMPRESSED SENSING

CROSS REFERENCE TO RELATED APPLICATIONS

The Application is a Continuation of U.S. application Ser. No. 13/316,857, filed on 12 Dec. 2011, which is a Continuation of U.S. application Ser. No. 12/685,468, filed on 11 Jan. 2010, which was issued as U.S. Pat. No. 8,077,988 on 13 Dec. 2011, which is a Continuation of U.S. application Ser. No. 11/199,675, filed on 8 Aug. 2005, which was issued as U.S. Pat. No. 7,646,924 on 12 Jan. 2010, which claims priority to U.S. Provisional Application No. 60/600,324, filed on 9 Aug. 2004, each of which is incorporated herein in its entirety by this reference thereto.

BACKGROUND

Technical Field

The invention relates to the processing of digital information. More particularly, the invention relates to a method and apparatus for allowing acceptable-quality reconstruction of a signal, image, spectrum, or other digital object of interest.

Discussion of the Prior Art

In many fields of science and technology, it is desired to obtain information about a subject by measuring a digital signal which represents that subject. Examples include: Medical imaging (see F. Natterer, *The Mathematics of Computerized Tomography*, J. Wiley (1986); C. L. Epstein *Introduction to the mathematics of medical imaging*, Upper Saddle River, N.J.: Pearson Education/Prentice Hall (2003)), Mass Spectrometry (see A. Brock, N. Rodriguez, R. N. Zare, *Characterization of a Hadamard transform time-of-flight mass spectrometer*, Review of Scientific Instruments 71, 1306 (2000); P. Jansson, *Deconvolution: with applications in spectroscopy*, New York: Academic Press (1984)), NMR Spectroscopy (see J. Hoch, A. Stern, *NMR Data Processing* Wiley-Liss, New York (1998)), and Acoustic Tomography (see J. Claerbout, *Imaging the Earth's Interior*, Blackwell Scientific Publications, Inc. (1985)). In these different cases, the measurements are intended to allow the construction of images, spectra, and volumetric images depicting the state of the subject, which may be a patient's body, a chemical in dilution, or a slice of the earth. Many other examples can be given in other fields.

Time and effort are involved in capturing data about the underlying object. For example, it can take time to perform an MRI scan of a patient, it can take time to perform a 3D CT scan of a patient, it can take time to measure a 3D NMR spectrum, it can take time to conduct a 3D seismic survey.

In all cases, it would be highly desirable to obtain acceptable-quality reconstruction of the desired image, spectrum, or slice with fewer measurements and consequently less measurement time. The benefits could translate into less cost, more system throughput, and perhaps less radiation dosage, depending on the specifics of the system under study and the sensor characteristics.

In each of such fields there is a currently-accepted practice for the number of measurements required to obtain a faithful rendering of the object of interest (see F. Natterer, *The Mathematics of Computerized Tomography*, J. Wiley (1986); J. R. Higgins, *Sampling theory in Fourier and signal analysis: foundations*, Oxford: New York: Clarendon Press; Oxford University Press (1996)). This accepted number of measurements sets the scale for the effort and cost required to obtain adequate information.

SUMMARY

The invention provides a method and apparatus for making reduced numbers of measurements compared to current practice and still give acceptable quality reconstructions of the object of interest.

In one embodiment, a digital signal or image is approximated using significantly fewer measurements than with traditional measurement schemes. A component x of the signal or image can be represented as a vector with m entries; traditional approaches would make m measurements to determine the m entries. The disclosed technique makes measurements y comprising a vector with only n entries, where n is less than m. From these n measurements, the disclosed invention delivers an approximate reconstruction of the m-vector x.

In another embodiment, special measurement matrices called CS-matrices are designed for use in connection with the embodiment described above. Such measurement matrices are designed for use in settings where sensors can allow measurements y which can be represented as $y=Ax+z$, with y the measured n-vector, x the desired m-vector and z an n-vector representing noise. Here, A is an n by m matrix, i.e. an array with fewer rows than columns. A technique is disclosed to design matrices A which support delivery of an approximate reconstruction of the m-vector x, described above.

Another embodiment of the invention discloses approximate reconstruction of the vector x from the reduced-dimensionality measurement y within the context of the embodiment described above. Given the measurements y, and the CS matrix A, the invention delivers an approximate reconstruction $x^{\#}$ of the desired signal x. This embodiment is driven by the goal of promoting the approximate sparsity of $x^{\#}$.

DETAILED DESCRIPTION

The reader of this document is assumed to be familiar with the standard notation of linear algebra, in particular the notions of matrices, (column) vectors, matrix-vector product, systems of linear equations (see G. H. Golub, C. F. Van Loan, *Matrix Computations*. Baltimore: Johns Hopkins University Press (1983); P. Gill, W. Murray, M. Wright, *Numerical linear algebra and optimization*. Redwood City, Calif.: Addison-Wesley Pub. Co. (1991)). The reader is also assumed to be familiar with standard notions in large-scale scientific computing and engineering computation: these include linear programming (see P. Gill, W. Murray, M. Wright, *Numerical linear algebra and optimization*. Redwood City, Calif.: Addison-Wesley Pub. Co. (1991)), quadratic programming, iterative solution of linear systems (see A. Greenbaum, *Iterative methods for solving linear systems*, Frontiers in Applied Mathematics 17, SIAM, Philadelphia, Pa. (1997)), and related ideas. The required background can be obtained by reading books associated with college courses in linear algebra and/or matrix analysis, and by reading books associated with courses in optimization and in large-scale scientific computing. It may also be useful to have familiarity with signal processing (see S. Mallat, *A Wavelet Tour of Signal Processing*. Second edition. Academic Press (1999)) and with the notion that certain sensors operate by acquiring linear combinations of signal elements (see F. Natterer, *The Mathematics of Computerized Tomography*, J. Wiley (1986); C. L. Epstein *Introduction to the mathematics of medical imaging*, Upper Saddle River, N.J.: Pearson Education/Prentice Hall (2003); P. Jansson, *Deconvolution: with applications in spectroscopy*, New York: Academic Press (1984); J. Hoch, A. Stern, *NMR Data Processing* Wiley-Liss, New York (1998); and J. Claerbout, *Imaging the Earth's Interior*, Blackwell Scientific Publications, Inc. (1985)).

What would be highly desirable would be to have a system comprising methods to make reduced numbers of measurements compared to current practice and still give acceptable quality reconstructions of the object of interest. Herein disclosed is a method and apparatus for allowing acceptable-quality reconstruction of a signal, image, spectrum or other digital object of interest. The preferred embodiment requires reduced numbers of measurements about the object as compared to standard measurement methods. The object of interest is assumed to be representable as a vector x with m entries. The m entries correspond to data obtainable by standard methods of measurement. The disclosed method and apparatus makes measurements yielding a vector y with n entries. Here n<m, corresponding to reduced numbers of measurements. The disclosed method and apparatus then delivers an approximation to x by a subsequent processing step known as reconstruction. The method and apparatus therefore comprises two particular components which must be combined:

(1) Measurement Matrix. Associated with a realization of the invention is an n by m matrix A. The proposed measurements y obey the equations y=Ax+z, where Ax denotes the standard matrix-vector product and z denotes noise.

(2) Reconstruction procedure. Associated with the invention is an algorithm which, given a vector y with n entries and a matrix A with n times m entries, delivers an approximate solution $x^\#$ obeying $y=Ax^\#+e$, with e the reconstruction error.

Each system component is discussed below in turn.

Measurement Matrices

The invention involves matrices A which are n by m numerical arrays and which define the measurements of the system. It is not the case that an arbitrary matrix may be used, however, there is a large supply of matrices which might be used. We will call the matrices which may be used CS-matrices, (CS=Compressed Sensing).

It is proposed that in a preferred embodiment of the invention, the sensor technology should be deployed in such a way that the measured vector y is (perhaps a noisy version of) Ax. The CS matrix A is in general a dense matrix, with all entries nonzero, and the operation Ax gives outputs which in general mix together all the entries of x.

A CS matrix A has the following character: it can be represented as a matrix product A=U B where B is p by m and U is n by p. In the preferred embodiment, p is equal to m, so that B is a square matrix. However, other values of p can be of interest in some applications (in which case typically p>m). In the preferred embodiment, B is a matrix with the property that, for typical objects of interest, i.e. images, spectra, etc. Bx is sparse or is approximately a sparse vector. In the preferred embodiment, B is an orthogonal matrix, although this can be relaxed in many applications.

In the preferred embodiment, U is an n by p matrix with the properties that:

(1) the columns of U are of unit length in the Euclidean norm;

(2) the square matrix $G=U^TU$, where $U^T$ denotes the transpose (real-valued matrix entries) or the conjugate transpose (complex-valued matrix entries), has its off-diagonal entries bounded in absolute value by a so-called coherence parameter M. It is desired that M be small, for example, M might be as small as $1/\sqrt{n}$. In general, M cannot be zero because U cannot be a square matrix, and so cannot be an orthogonal matrix. For a discussion of coherence, see D. L. Donoho and X. Huo, IEEE Trans. Info Theory, vol. 47, 2845-62 (2001) and D. L. Donoho and M. Elad, Proc. Natl. Acad. Sci., vol. 100, pp 2197-2002, (2003).

Necessarily the representation A=UB indicated above is non-unique. However, the representation is very useful for designing CS matrices. A technique is disclosed herein for using this representation to obtain CS matrices. Because of this non-uniqueness, it may be possible to obtain a CS matrix in which A can not be easily seen to have the desired structure. The assumed structure of the matrix allows a preferred way to generate CS matrices. However, the true criterion for CS matrices is whether they permit Compressed Sensing. A test is disclosed herein that allows one to check by a computer experiment whether a specific matrix A can be used in connection with the disclosed invention.

Additional properties of A are desirable in certain applications, but they vary from application to application, and are not strictly necessary to the invention. Examples include that the B factor is the matrix representation of a known digital transform, such as wavelet, Fourier, sub-band transforms, or that the U factor is part of a known transform, e.g. a selection of a subset of n rows of a known p times p matrix, such as the p times p Fourier matrix.

Reconstruction

Suppose now we have observed y—the vector based on n<m measurements—and wish to reconstruct x, the vector which could have been obtained based on m traditional measurements.

Ignoring noise for the moment, we are therefore trying to solve an underdetermined system of equations y=Ax for x, where both A and y are known. By standard ideas in Linear Algebra, it is known that this system of linear equations is underdetermined and so cannot have a unique solution in general. It would seem that we cannot hope to recover the m-vector x from the n-vector y reliably.

A driving property behind the disclosed approach is that the signals x of interest are compressible. This is a known property of standard images, medical images, spectra, and many other digital content types. The success of standard data compression tools such as JPEG, JPEG-2000, and MPEG-4 applied to such content types shows that wavelet transforms, local Fourier transforms and other transforms can all successfully compress such content types.

In a specific applications field, this compressibility has the following interpretation: Take n traditional measurements to obtain x, and apply a standard orthogonal transform B such as wavelets or local Fourier. The measured vector x would be compressed to a nearly sparse vector by the matrix B. That is, Bx would be a vector which can be well-approximated by a relatively small number of large-amplitude entries, with the remaining entries relatively small in amplitude (see S. Mallat, *A Wavelet Tour of Signal Processing*. Second edition. Academic Press (1999)).

The reconstruction technique herein disclosed exploits this property. It delivers, among approximate solutions to y=Ax+e with e small, an approximate solution $x^{\#}$ for which $Bx^{\#}$ is sparse or nearly sparse. This goal of sparsity promotion can be attained by any of several embodiments.

Constructing CS-Matrices

As disclosed herein, there is an abundance of CS matrices and there are several natural methods to create them.

One preferred embodiment starts from a matrix B which sparsifies the content type of interest. For standard content types, B could be a discrete wavelet transform, a discrete Fourier transform, a discrete curvelet transform, discrete ridgelet transform, or other known mathematical transform. The key property that B must have is that for typical vectors x of the type we would like to make measurements about, the product $\theta$=Bx is a vector which is nearly sparse. This means that, up to a tolerable approximation error, the vector $\theta$ has relatively few nonzero entries.

Once we have this matrix B, we create matrices A by the prescription A=UB, where U is one of the following preferred types of matrices:

1. Random n by p matrices with independent entries. Such matrices have entries generated by a standard random number generator (see J. Gentle, *Random number generation and Monte Carlo methods*, New York: Springer (1998)). In a preferred embodiment, the random number generator may have any of several distributions, all of which have worked experimentally:

(a) Gaussian/Normal distribution. The numbers are generated with the standard normal distribution having a probability density with the familiar bell-shaped curve (see G. Seber, A. Lee, *Linear Regression Analysis*, second edition. J. Wiley and Sons, New York (2003); A. Gelman, J. Carlin, H. Stern, D. Rubin, *Bayesian Data Analysis*, second edition. Chapman and Hall/CRC, Boca Raton, Fla. (2004)).

(b) Random signs. The numbers are +1 or −1 with equal probability.

(c) Random sparse matrices. The numbers are +1 or −1 with probability $\pi$ each, or 0 with probability $1-2*\pi$. Here $\pi$ is a parameter of the construction; it lies between 0 and ½.

(d) Random uniform numbers. The numbers are in the range −1 to 1 with equal density to every interval throughout this range (see J. Gentle, *Random number generation and Monte Carlo methods*. New York: Springer (1998)).

By random numbers we here intend that any of the standard sources of pseudo-random numbers can be used, i.e. of the kind that are common today in computer science. This does not rule out the use of true random numbers, produced by physical devices (see J. Walker, *HotBits: Genuine random numbers, generated by radioactive decay* (1996)). This preferred list does not rule out other distributions of interest. The random number generators are preferred to be of the type that generate uncorrelated and, in fact, statistically independent random numbers, but other embodiments may be acceptable; see the next section.

2. Random Orthoprojectors. We generate a matrix V with standard normal entries (as above), but in addition we orthogonalize the rows of the matrix by a standard procedure, such as the Gram-Schmidt procedure, producing a matrix U. The matrix U is an n-by-p matrix which offers an orthogonal projection from $R^p$ to $R^n$. If the random numbers were truly standard normal and independent to begin with, then U is a uniformly distributed orthoprojector (se Y. Baryshnikov, R. Vitale, Regular Simplices and Gaussian Samples. *Discrete & Computational Geometry* 11: 141-147 (1994)).

3. Partial Fourier Matrices. We generate an n by p matrix F with n rows which are randomly sampled without replacement from among the p rows of the orthogonal p by p Fourier matrix (see E. Candès, J. Romberg, T. Tao, Robust Uncertainty Principles: Exact Recovery from highly incomplete measurements. To appear, *IEEE Transactions on Information Theory* (2004)).

4. Partial Hadamard Matrices. We generate an n by p matrix H with n rows which are randomly sampled without replacement from among the p rows of the orthogonal p by p Hadamard matrix (see M. Harwit, N. Sloane, *Hadamard Transform Optics*. New York: Academic Press (1979)).

This list has been chosen as teaching a practitioner skilled in scientific signal processing and computing one of several ways of obtaining a matrix U. Other methods are not precluded. Such other methods could include the use of various matrices from the theory of designs and codes; in the field of experimental design it is standard to create matrices X which are n by p where n is less than p and X'X has ones on the diagonal while X'X has off-diagonal entries bounded by M, for some small number M (see M. Harwit, N. Sloane, *Hadamard Transform Optics*. New York: Academic Press (1979); and N. Sloane, M. Harwit, Masks for Hadamard transform optics, and weighing designs. *Applied Optics*. Vol. 15, No. 1 (January 1976)). Any such matrix may be contemplated for use here, subject to verification.

Verifying CS-Matrices

It can be very important to check that a given proposed CS matrix really works. This means that it produces acceptable results for compressed sensing in a given application. We describe a way to validate performance below. This validation is important for two reasons: First, we just described ways to generate such matrices by using randomness. A side effect of using randomness is that occasionally, the matrices generated randomly do not have good properties, even though typically they do. Therefore, it is in principle always necessary to check performance. But in addition, many practitioners do not want to go to the time and effort of using true random numbers produced by physical randomness, and instead use computer-based pseudo-random numbers. The theory of randomness, strictly speaking, does not apply in this case. It would also be desirable to verify the CS properties when the preferred methods of generating a CS matrix described above have been avoided, in favor of other methods proposed by the user. Below we describe a computational experiment which the system designer may use to check if a proposed matrix really works.

Sparsity-Promoting Reconstruction Algorithms

A second ingredient for the invention is the reconstruction algorithm for obtaining an approximate reconstruction of x from the reduced-dimensionality measurement y. As described above, it should have the general property of being a sparsity promoting method: when there exists a solution x such that $\theta$=Bx is nearly sparse, the methods should be well-suited to producing a sparse or nearly-sparse approximate solution. In the following list we describe several methods which have been found to offer the desired sparsity-promoting properties.

1. $l_1$ minimization. One solves the problem:

$$\min |Bx|_1 \text{ subject to } y=Ax.$$

Here $|.|_1$ denotes the standard $l_1$ norm, or sum of absolute values. This is an $l_1$-minimization problem and can be implemented by a standard linear programming procedure, for example based on the simplex method (see G. Dantzig, *Linear programming and extensions*. Princeton, N.J.: Princeton University Press (1963)), on interior-point methods (see S, Boyd, L. Vandenberghe, *Convex Optimization*, Cambridge University Press (2002)), and on other algorithms for linear programming, such as iteratively-reweighted least-squares. Standard references in linear programming (see G. Dantzig, *Linear programming and extensions*. Princeton, N.J.: Princeton University Press (1963); and S, Boyd, L. Vandenberghe, *Convex Optimization*, Cambridge University Press (2002)) teach the practitioner how to solve such problems. Scientific papers, such as the authors' own publications, also do so (see S. Chen, D. Donoho, M. Saunders, Atomic decomposition by basis pursuit. *SIAM Journal on Scientific Computing*, 129-(1998)). The solution $x^\#$ to this problem is taken as the approximate reconstruction of x.

Alternatively, one solves the constrained optimization problem:

$$\min |Bx|_1 \text{ subject to } |y-Ax|_p \le t$$

Here $|.|_p$ denotes an $l_p$ norm, i.e. the p-th root of sum of p-th powers of absolute values, where $1 \le p < \infty$. The case $p=\infty$ is also useful; if corresponds to $|v|\infty \max|v(i)|$ Valuable choices include an $l_2$ or an $l_0$ norm. This is particularly useful in case our measurements y=Ax+z where z is a noise term. The parameter t has to do with the anticipated size of the noise z, i.e. t is chosen about the same size as $|z|_p$.

This is a convex minimization problem and can be implemented by a standard convex programming procedure, for example based on the active-set methods, and on interior-point methods. Standard references in convex programming teach the practitioner how to solve such problems (see S, Boyd, L. Vandenberghe, *Convex Optimization*, Cambridge University Press (2002)). Scientific papers, such as the authors' own publications, also do so (see S. Chen, D. Donoho, M. Saunders, Atomic decomposition by basis pursuit. *SIAM Journal on Scientific Computing*, 129-(1998)). The solution $x^\#_{1,t}$ to this problem is taken as the approximate reconstruction of x.

Other variants are possible as well:

$$\min |Bx|_1 \text{ subject to } |A'(y-Ax)|_p \le t$$

This is again a convex optimization problem and can be computed using standard tools from the field of convex optimization. The solution can be used as an approximate reconstruction of x.

2. $l_1$ penalization. One solves the problem:

$$\min |Bx|_1 + \lambda |y-Ax|_p$$

Here $\lambda > 0$ is a regularization parameter to be chosen by the system designer.

For $p \ge 1$, this is a convex minimization problem and can be solved numerically by a standard convex programming procedure (see S. Chen, D. Donoho, M. Saunders, Atomic decomposition by basis pursuit. *SIAM Journal on Scientific Computing*, 129-(1998)). Other variants are possible as well:

$$\min |Bx|_1 + \lambda |A'(y-Ax)|_p$$

For $p \ge 1$, this is again a convex optimization problem. In all cases an exact or approximate solution is taken as an approximation to the desired signal x.

3. Stepwise Fitting. One can iteratively apply the procedure sometimes known as stepwise regression in statistics (see G. Seber, A. Lee, *Linear Regression Analysis*, second edition. J. Wiley and Sons, New York (2003)) or matching pursuit (see S. Mallat, *A Wavelet Tour of Signal Processing*. Second edition. Academic Press (1999))/orthogonal matching pursuit in signal processing. Starting from the definition $r_0=y$, one successively performs a series of steps. At the s-th step, s=1, 2, . . . , one:

(a) finds that single column of the matrix B A' which has the highest correlation with $r_s$;
(b) orthogonally projects $r_s$ onto that column, adding the projection to the approximation and leaving a residual $r_{s+1}$;
(c) checks if the current approximation is accurate; and
(d) if not, increments s by 1 and goes to (a).

This technique is well understood and taught in many sources in statistical modeling and in signal processing. There are four details of interest:

(1) the correlation measure discussed is the usual normalized inner product $<r_s, c_j>/(|r_s|_2 |c_j|_2)$ where $c_j$ is the j-column of BA'.
(2) the orthogonal projection in step (b) can be onto the span of the column identified at stage s, or onto the span of all columns up to and including stage s.
(3) the stopping rule in (c) can be based on statistical considerations, e.g. reductions in residual sum of squares, statistical significance of the F-to enter coefficient (see G. Seber, A. Lee, *Linear Regression Analysis*, second edition. J. Wiley and Sons, New York (2003)), etc., or based on the principle of stopping after some given number of steps have passed.
(4) It will be well-understood by a practitioner skilled in model fitting that the process of successively subtracting fitted model terms corresponds to a process of successively building up an approximation a term at a time. Thus if the stepwise method stops at stage s which is much less than n, it implicitly produces a sparse approximation.

4. Stagewise Fitting.

One can iteratively apply the procedure sometimes known as stagewise regression in statistics or iterative hard thresholding in signal processing. Starting from the definition $r_0=y$, one successively performs a series of stages. At the s-th stage, s=1, 2, . . . , one:

(a) finds all columns of the matrix B A' which have correlation with $r_s$ exceeding $z/\sqrt{n}$;
(b) orthogonally projects $r_s$ onto those columns leaving a residual $r_{s+1}$;
(c) checks if the current approximation is accurate; and
(d) if not, increments s by 1 and goes to (a).

There are four details of interest:

(1) the orthogonal projection in step (b) can be onto the span of the columns identified at stage s, or onto the span of all columns up to and including stage s.
(2) Strict orthogonal projection is not required, though it is recommended. Instead, one can use an iterative procedure which successively performs one-dimensional projections on different columns and subtracts them out either in parallel or sequentially. One can even perform such a procedure for a single iteration.
(3) The threshold z in (a) can be based on statistical considerations, e.g. the idea that correlations behave like standard normals with standard deviation $1/\sqrt{n}$, or based on some empirical choice which works well in experiments.
(4) The overall procedure can be stopped when the residual correlations are consistent with a pure noise signal.

5. Alternating Projection methods. Other algorithms known to be useful in connection with sparse fitting may be useful here as well. These include the use of iterative solvers which successively approximate y by projecting residuals onto a sequence of constraint sets (non-negativity, total variation, etc.), perhaps combined with a sequence of subspaces. Such methods are well-known in conjunction with signal processing and are taught in many sources (see C. Byrne, Iterative projection onto convex sets using multiple Bregman distances, *Inverse Problems* 15 1295-1313 (1999);

and D. Youla, Generalized Image Restoration by the Method of Alternating Orthogonal Projections. *IEEE Trans. Circuits and Systems*, 25, No. 9 (1978)). Thus, we could try to find a vector x obeying simultaneously such constraints as x≥0, $|y-Ax|_2 \leq t$, Variation(x)≤C, by a process of alternately projecting the current residual on each component constraint set, subtracting the projection, obtaining a new residual, and continuing. Here Variation(x) means a discrete implementation of the bounded variation functional; this is discussed in numerous image processing publications (see L, Rudin, S, Osher, E, Fatemi, Nonlinear total variation based noise removal algorithms, *Physica D*, 1992 (1992)), and is only listed here as an example.

6. Bayesian Modeling. By Bayesian modeling (see A. Gelman, J. Carlin, H. Stern, D. Rubin, *Bayesian Data Analysis*, second edition. Chapman and Hall/CRC, Boca Raton, Fla. (2004)), one can formally specify a probability model that makes x sparsely representable, for example by positing that Bx has a probability distribution such as Laplace or Cauchy, formally specifying that y=Ax+z with a formal noise model for z and then performing Bayesian inference for x. Such Bayesian methods are well-taught in numerous sources (see A. Gelman, J. Carlin, H. Stern, D. Rubin, *Bayesian Data Analysis*, second edition. Chapman and Hall/CRC, Boca Raton, Fla. (2004)). The only point of interest here is to use Bayesian methods which posit the underlying sparsity of x in some analysis framework Bx.

Variations

Several variations on the above ideas can widen the scope of applicability.

Sub-Band Sensing

In some problems it is useful to view the object of interest x as a concatenation of several objects $x_1$, $x_2$, $x_3$, etc. and apply different measurement schemes for each one. For example, one could apply traditional measurement to $x_1$ but compressed sensing to $x_2$, etc.

To illustrate how this works, consider the case of sub-band decomposition (see S. Mallat, *A Wavelet Tour of Signal Processing*. Second edition. Academic Press (1999)). Common in signal processing is the notion of representing a signal or image x in terms of sub-bands with coefficient vectors $x_1$, $x_2$, $x_3$, . . . ; each vector represents that part of the signal in a given frequency band (see S. Mallat, *A Wavelet Tour of Signal Processing*. Second edition. Academic Press (1999)). Thus, in standard dyadic wavelet analysis the sub-bands consist of information at scales 1, ½, ¼, etc., We can treat any one of the sub-band coefficient vectors $x_j$ as the signal of interest. Suppose that such a set of coefficients has $m_j$ entries and is defined in terms of the original signal via a sub-band operator $S_j$; this has a representation as an $m_j$ by m matrix $x_j=x$. Design a CS matrix $A_j$ associated with an $n_j$ by $m_j$ sized problem, using the techniques described in earlier parts of this disclosure. As it stands this matrix cannot be applied in the original sensing problem because the original object has dimension m. To apply it, we define a CS matrix $C_j$ via $C_j=A_j S_j$. The matrix $C_j$ is $n_j$ by m and can be used for compressed sensing of $x_j$ on the basis of compressed measurements from the object x.

Post-Processing Noise Removal

It is sometimes the case that compressed sensing produces an approximation to the signal/image of interest, with an error that resembles noise. In such cases, it is possible to improve the quality of the reconstruction by applying some post-processing: filtering to reduce the noise level. Any standard noise removal scheme, from simple running averages and running medians to more sophisticated wavelet de-noising, may be applied (see D. Donoho, De-noising by soft-thresholding, *IEEE Trans on Information Theory* 41(3): 613-627 (1994); R. Coifman, D Donoho, Translation invariant denoising. In *Wavelets and Statistics*, Ed. Anestis Antoniadis Springer-Verlag Lecture Notes (1995); and D. Donoho, Compressed Sensing. To Appear, *IEEE Trans. Information Theory* (2004)).

Testing a CS-System

As indicated earlier, it is important to verify that a given matrix A actually offers compressed sensing. A method to do this is as follows:

Given the proposed matrix A, generate a suite of trial signals $x_1$, $x_2$, . . . $x_T$, representing typical signals seen in practice in this application. For example this suite could consist of signals which were previously measured by traditional uncompressed sampling methods. For each trial signal x (say), generate a test dataset y=Ax (noiseless case) or y=Ax+z (noisy case). Run a sparsity-promoting reconstruction algorithm, for example, one of the algorithms mentioned above. Observe the output $x^\#$ of the algorithm and check either informally or by formal means that the output is of sufficiently high quality. If the result is judged to be of sufficient quality, then a successful CS-system is obtained. If not, generate a new candidate CS matrix and evaluate using the same empirical testing approach. Repeat this whole process of generating and testing candidate CS matrices several times if needed. If, at a given (n,m) combination, one does not succeed in finding a successful CS matrix A, then increase the value of n and repeat the same exercise.

EXAMPLE

Figure 1:
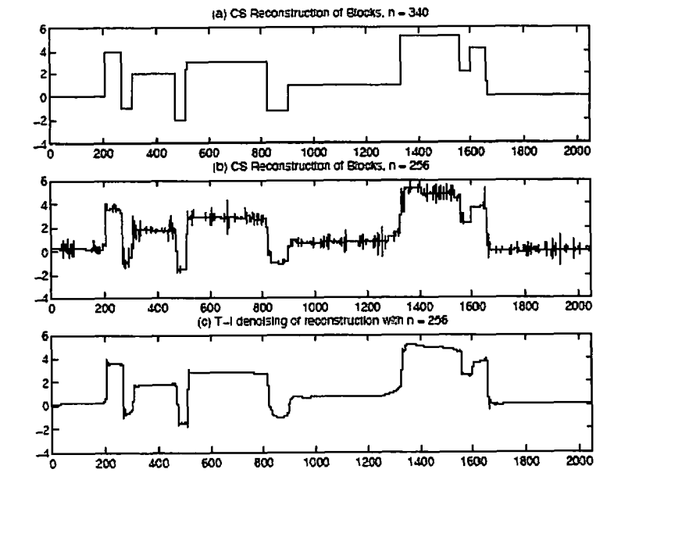
FIG. 1 shows an example of compressed sensing in action.

FIG. 1 shows an example of compressed sensing in action. The signal Blocks, available in Wavelab (see J. Buckheit, D. Donoho, Wavelab and reproducible research in *Wavelets and Statistics*, Ed. Anestis Antoniadis Springer-Verlag Lecture Notes (1995)), has m=2048 and would traditionally need 2048 samples. However, Blocks is sparse when analysed in the Haar wavelet basis, essentially because of its piecewise constant character.

FIG. 1 shows the result of CS applied to this signal, with a matrix A having iid Gaussian entries, and using minimum l1 norm reconstruction. Even though only n=340 samples are taken, the result of length 2048 is perfectly reconstructed. That is, in this case, if we had shown both the original object and the reconstructed one, there would be no difference; hence we display on the reconstruction.

On the other hand, if only n=256 samples had been taken, the same approach would have given a noisy reconstruction, as can be seen from the second panel. This example illustrates that CS can work, but that there are definite limits to the power of CS. In this example, 6-to-1 reduction in the number of samples taken is successful, while 8-to-1 reduction is less successful. By testing the system as recommended above, one can develop an understanding of the sampling rate required to get acceptable results in the application of interest.

The third panel of FIG. 1 also shows the result of post processing the noisy reconstruction based on n=256 samples using wavelet denoising. The visual appearance of the noise-filtered CS output seems improved and might be acceptable in some applications.

Technical Implementation

Exemplary Digital Data Processing Apparatus

Data processing entities such as a computer may be implemented in various forms. One example is a digital data processing apparatus, as exemplified by the hardware components and interconnections of a digital data processing apparatus.

As is known in the art, such apparatus includes a processor, such as a microprocessor, personal computer, workstation, controller, microcontroller, state machine, or other processing machine, coupled to a storage. In the present example, the storage includes a fast-access storage, as well as nonvolatile storage. The fast-access storage may comprise random access memory ("RAM"), and may be used to store the programming instructions executed by the processor. The nonvolatile storage may comprise, for example, battery backup RAM, EEPROM, flash PROM, one or more magnetic data storage disks such as a hard drive, a tape drive, or any other suitable storage device. The apparatus also includes an input/output, such as a line, bus, cable, electromagnetic link, or other means for the processor to exchange data with other hardware external to the apparatus.

Despite the specific foregoing description, ordinarily skilled artisans (having the benefit of this disclosure) will recognize that the invention discussed above may be implemented in a machine of different construction, without departing from the scope of the invention. As a specific example, one of the components may be eliminated; furthermore, the storage may be provided on-board the processor, or even provided externally to the apparatus.

Logic Circuitry

In contrast to the digital data processing apparatus discussed above, a different embodiment of this disclosure uses logic circuitry instead of computer-executed instructions to implement processing entities of the system. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

Signal-Bearing Media

Wherever the functionality of any operational components of the disclosure is implemented using one or more machine-executed program sequences, these sequences may be embodied in various forms of signal-bearing media. Such a signal-bearing media may comprise, for example, the storage or another signal-bearing media, such as a magnetic data storage diskette, directly or indirectly accessible by a processor. Whether contained in the storage, diskette, or elsewhere, the instructions may be stored on a variety of machine-readable data storage media. Some examples include direct access storage, e.g. a conventional hard drive, redundant array of inexpensive disks ("RAID"), or another direct access storage device ("DASD"), serial-access storage such as magnetic or optical tape, electronic non-volatile memory, e.g. ROM, EPROM, flash PROM, or EEPROM, battery backup RAM, optical storage e.g. CD-ROM, WORM, DVD, digital optical tape, or other suitable signal-bearing media including analog or digital transmission media and analog and communication links and wireless communications. In one embodiment, the machine-readable instructions may comprise software object code, compiled from a language such as assembly language, C, etc.

Logic Circuitry

In contrast to the signal-bearing medium discussed above, some or all functional components may be implemented using logic circuitry, instead of using a processor to execute instructions. Such logic circuitry is therefore configured to perform operations to carry out the method of the disclosure. The logic circuitry may be implemented using many different types of circuitry, as discussed above.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method, comprising:
reconstructing a compressible digital image or a digital acoustic signal that is represented as a vector x with m entries, wherein the reconstructing is based on a vector y with n entries, wherein n is less than m, and wherein the reconstructing comprises:
a processor taking n traditional measurements to obtain the vector x;
a processor compressing the measured vector x by a known matrix B to create a vector Bx, wherein the vector Bx is a vector that is approximated by one or more amplitude entries, with remaining entries that are smaller in amplitude;
a processor delivering among approximate solutions y=Ax+e, with e being a reconstruction error, a delivered approximate solution $x^{\#}$ for which $Bx^{\#}$ is sparse or substantially sparse; and
a processor applying post processing filtering to the delivered approximate solution to reduce a noise level of the delivered approximate solution,
wherein at least one of the processors comprises a hardware implementation.

2. The method of claim 1, wherein the known matrix B comprises any of a discrete wavelet transform, a discrete Fourier transform, a discrete curvelet transform, or a discrete ridgelet transform.

3. A method, comprising:
verifying in a compressed sensing (CS) scheme, used to approximate a digital image or a digital acoustic signal, that a given matrix A offers compressed sensing, the method further comprising:
given a proposed matrix A, an n by m matrix:
a processor generating a plurality of trial signals x=$x_1$, $x_2$, ... $x_T$, representing typical signals;
for each of the generated trial signals x, a processor generating a test dataset for a vector y, wherein the test data set comprises any of y=Ax (noiseless case) or y=Ax+z (noisy case), where z denotes noise;
a processor running a sparsity-promoting reconstruction algorithm;
a processor observing an output $x^{\#}$ of the reconstruction algorithm;
a processor checking that the output is of sufficient quality;
wherein if the output is judged to be of sufficient quality, then a successful CS system is obtained; and
wherein if not, a processor generating a new candidate CS matrix and
testing the new candidate CS matrix until a successful CS matrix A is not found; and wherein if, at a given (n,m) combination, a successful CS matrix A is not found, a processor then increasing the value of n and repeating the method, by returning control to the step beginning with "a processor generating a plurality of trial signals", and wherein at least one of the processors comprises a hardware implementation.

4. The method of claim 3, wherein n is less than m.

5. A method for sub-band sensing for a digital image or a digital acoustic signal represented as a vector x, wherein the digital image or a digital acoustic signal x comprises a concatenation of a plurality of objects $x_1$, $x_2$, $x_3$, the method comprising:

a processor applying a different compressed sensing (CS) measurement scheme for each one of the objects;

for each of the objects, in a scheme where a component $x_j$ of the digital image or a digital acoustic signal x is represented as a vector with $m_j$ entries, a processor making measurements y comprising a vector with only $n_j$ entries, where $n_j$ is less than $m_j$; and from $n_i$ measurements, given a CS matrix $A_j$, the CS matrix $A_j$ represented as a matrix product $A_j=U_iB_i$ where $B_i$ is a known transform such that $B_ix_j$ is a vector that is approximated by a one or more amplitude entries, with remaining entries smaller in amplitude, and where $U_i$ is a matrix that stably recovers at least one sparse vector of a particular dimension from lower-dimensional data; and a processor producing an approximate reconstruction of an $m_i$-vector $x_j$, wherein at least one of the processors comprises a hardware implementation.

* * * * *